United States Patent [19]

Cox et al.

[11] Patent Number: 4,830,330

[45] Date of Patent: May 16, 1989

[54] CANDLE MANUFACTURING APPARATUS

[75] Inventors: Ronald C. Cox; Robert E. Grosjean, both of Haughton; Lola G. Grosjean; Victor E. Grosjean, both of Bossier City, all of La.

[73] Assignee: Strikes My Fancy, Inc., Bossier City, La.

[21] Appl. No.: 926,358

[22] Filed: Oct. 31, 1986

Related U.S. Application Data

[63] Continuation-in-part of Ser. No. 874,621, Jun. 16, 1986, abandoned.

[51] Int. Cl.⁴ ............ B29C 33/44

[52] U.S. Cl. ............ 249/85; 249/94; 249/97; 249/129; 249/95; 425/298; 425/803

[58] Field of Search ............ 425/803, 117, 298; 264/157, 271.1, 279, 297.1, 297.8; 249/83, 84, 85, 86, 93, 94, 95, 96, 97, 112, 120, 129

[56] References Cited

U.S. PATENT DOCUMENTS

| | | | |
|---|---|---|---|
| 13,042 | 6/1855 | Plumbe | 264/157 |
| 125,632 | 4/1872 | Truax | 425/803 |
| 695,027 | 3/1902 | Berry | 249/94 |
| 1,168,433 | 1/1916 | Seiter | 249/83 |
| 1,186,554 | 6/1916 | Crisenberry | 249/94 |
| 1,573,502 | 2/1926 | Peters | 249/97 |
| 1,596,179 | 8/1926 | Heltzel | 249/83 |
| 2,053,711 | 9/1936 | Glomb | 249/120 |
| 2,397,728 | 4/1946 | Dowsett et al. | 249/96 |
| 2,577,584 | 2/1948 | Hofreiter | 249/95 |
| 3,186,679 | 6/1965 | Williams | 264/157 |
| 3,769,396 | 10/1973 | Espinosa | 264/157 |
| 3,779,505 | 12/1973 | Sturm | 249/85 |
| 4,051,216 | 9/1977 | Bratchell | 264/157 |
| 4,332,537 | 6/1982 | Slepcevic | 249/83 |

FOREIGN PATENT DOCUMENTS

| | | | |
|---|---|---|---|
| 13027 | of 1893 | United Kingdom | 425/803 |

*Primary Examiner*—James Lowe

*Assistant Examiner*—Jeremiah F. Durkin, II

*Attorney, Agent, or Firm*—Herbert J. Hammond

[57] ABSTRACT

An apparatus for making candles which includes one or more receptacles. Support means are provided to support a length of wick material strung across each receptacle. The apparatus also has posts where a continuous length of wick material is secured across each receptacle and around the posts.

5 Claims, 3 Drawing Sheets

CANDLE MANUFACTURING APPARATUS

CROSS-REFERENCE TO RELATED APPLICATIONS

This application is a continuation-in-part of U.S. patent application Ser. No. 874,621, filed June 16, 1986 now abandoned.

TECHNICAL FIELD

The invention relates to the manufacture of candles and, in particular, to the manufacture of candles of various shapes without the use of molds.

BACKGROUND AND SUMMARY

A number of manufacturing procedures have been employed over the years to manufacture candles. An early method involves repeated dipping of candle wicks into molten wax to form the candle body from numerous layers of wax. However, the production time associated with this method is considerable because each layer of wax is formed by withdrawing the wick from the molten wax for a specified period to allow a wax layer to harden before depositing the next layer of wax on the candle. Production time is also increased by the need to cut the wick of each candle to an appropriate length and to fix the wick to a frame, rod or other device used to dip a number of candle wicks into molten wax simultaneously. In addition to being limited by its time-consuming nature, the dipping process can only be utilized to manufacture candles that are generally cylindrical.

In recent years, candles having various sizes and shapes, such as stars, hearts and animals, have become increasingly popular as decorations. Since the dipping process is incapable of producing such shapes, manufacturers turned to the use of molds to manufacture many types of decorative candles. A number of limitations, however, are associated with the use of molds. For example, molds can be quite costly to produce, but are limited to production of a particular shape. Production time is also complicated by the need to individually handle the candle wicks, such as when the wicks are inserted into each mold, thus lengthening production time. Production time is also increased by the mold itself, which insulates the wax, thereby slowing the cooling process during manufacture. Cooling of the candle wax is also often difficult to monitor, particularly when using molds that completely enclose the candle, requiring extension of the cooling period to ensure that the candle wax solidifies sufficiently before opening the mold.

The present invention provides a method and apparatus for manufacturing candles of virtually any shape without the foregoing limitations. In one embodiment, the apparatus includes a receptacle, for holding molten wax, having two opposing sidewalls. Each sidewall includes an array of apertures. Supported on the apparatus outside the tray and adjacent each of the opposing sidewalls are a number of wick support members, comprising vertical posts.

Candles are manufactured with the apparatus by weaving a continuous strand of wick material back and forth across the receptacle through the apertures of the opposing sidewalls to form a number of incremental lengths of wick material supported within the receptacle. Portions of the wick material between neighboring incremental lengths of the wick material within the receptacle are secured outside the receptacle by the wick support members. A sufficient quantity of molten wax is poured into the receptacle to at least contact the lengths of wick material therein. The wax is then allowed to partially solidify. Candles of practically any shape are then cut from the wax surrounding the wick material.

In another embodiment, the apparatus includes a plurality of receptacles for containing separate volumes of a quantity of molten wax. Structure is provided for holding a number of spaced incremental lengths of a length of wick material in contact with molten wax contained by the receptacles. Structure is also provided for holding portions of the wick material, between adjacent incremental lengths of wick material, out of contact with molten wax.

Candles are manufactured with the apparatus by stringing a length of wick material across the apparatus. Incremental lengths of the wick material are held within the receptacles. Portions of the wick material between adjacent incremental lengths are held outside of the receptacles. Molten wax is poured into the receptacles and allowed to at least partially harden around the incremental lengths of wick material. Candles of various shapes are then cut from the wax surrounding the wick material.

DESCRIPTION OF THE DRAWINGS

A more complete understanding of the invention may be had by reference to the following Detailed Description when taken in conjunction with the following Drawings, wherein.

DETAILED DESCRIPTION

Figure 1:
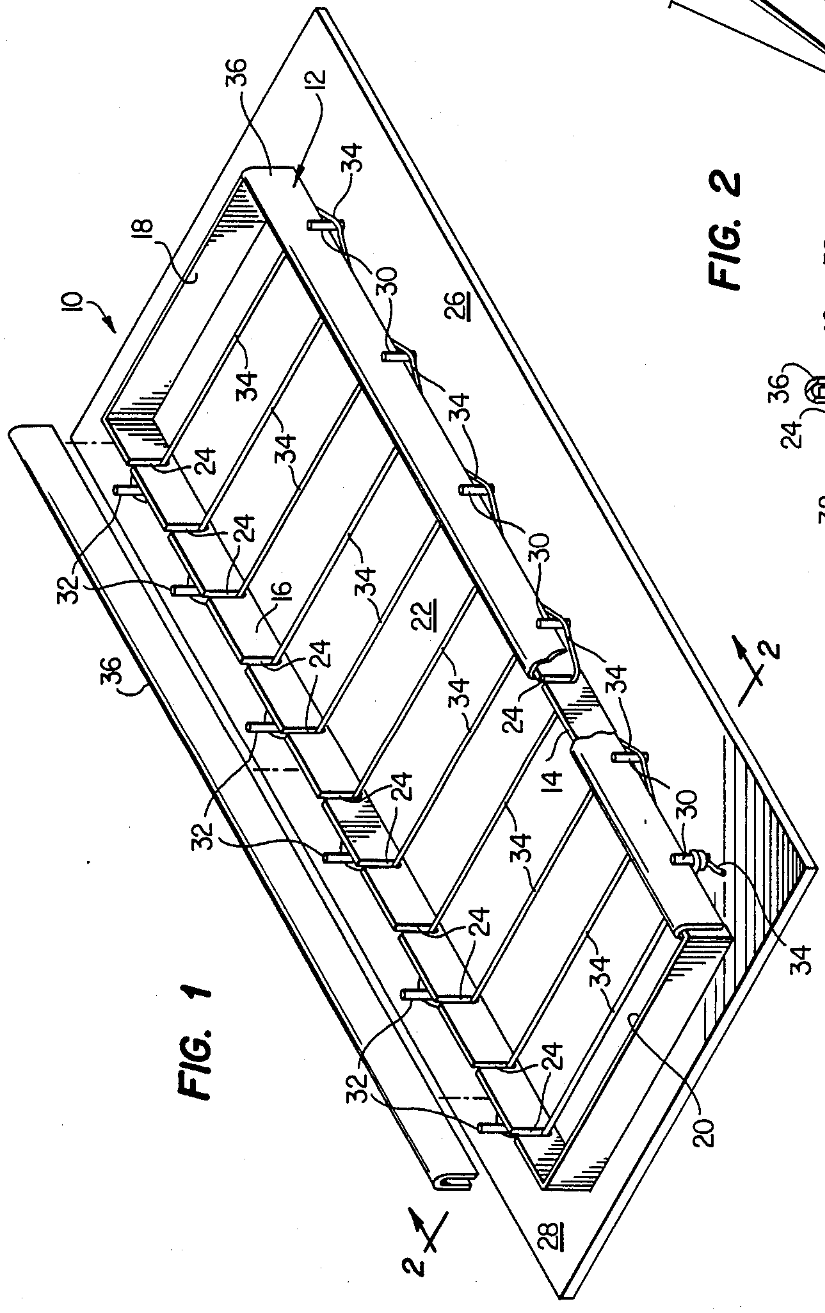
FIG. 1 is a perspective view of an apparatus incorporating a first embodiment of the invention which illustrates an early phase of the method of the invention.

FIG. 1 illustrates a candle making apparatus 10 incorporating a first embodiment of the invention. The apparatus 10 includes a receptacle 12 formed by a pair of sidewalls 14 and 16 and a pair of opposing end walls 18 and 20 extending upwardly from a bottom wall 22. The receptacle 12 is used to contain molten wax as candles are manufactured and is preferably made of sheet metal, hard plastic or other suitable material having a melting point substantially greater than the candle wax intended to be used.

The opposing sidewalls 14 and 16 each include an array of apertures 24 comprising slots extending downwardly from the upper edges of the sidewalls to a point above the bottom wall 22 of the receptacle approximately one-half the desired thickness of candles to be manufactured. The apertures 24 are substantially equally spaced along the sidewalls 14 and 16. Each aperture 24 of the sidewall 14 is located directly opposite a corresponding aperture 24 in the opposing sidewall 16.

The bottom wall 22 of the apparatus 10 extends laterally from the receptacle 12 to form a pair of flanges 26 and 28 adjacent the sidewalls 14 and 16, respectively. Extending upwardly from the flanges 26 and 28 are a number of posts 30 and 32, respectively. The posts 30 and 32 are cylindrical and extend above the flanges 26 and 28 to a height greater than the lower edges of their adjacent apertures 24.

The post 30 closest to the endwall 20 is in substantial alignment with the left-most apertures 24 (from the perspective of FIG. 1) of the sidewalls 14 and 16. The remaining posts 30, however, are positioned between every other adjacent pair of apertures 24 in the sidewall 14, as shown in FIG. 1. Correspondingly, the post 32 and apertures 24 closest to the end wall 18 of the receptacle are in substantial alignment. The remaining posts 32 are positioned between every other adjacent pair of apertures 24 in the sidewall 16, as shown in FIG. 1. The posts 30 and 32 serve as means for securing portions of a length of wick material 34 outside the receptacle 12 and out of contact with wax during the candle-making procedure.

The apparatus 10 is used to manufacture candles by first securing a continuous length of wick material 34 to the post 30 closest to the endwall 20 of the receptacle 12. The wick material 34 is then drawn through the left-most aperture 24 of the sidewall 14, across the receptacle 12 and through the left-most aperture 24 of the opposing sidewall 16. The wick material 34 is then trained around the left-most post 32, through the next adjacent aperture 24 in the sidewall 16, across the receptacle 12, and through the corresponding aperture in the opposing sidewall 14. The wick material 34 is trained around the second post 30 from the endwall 20, through the aperture 24 in the sidewall 14 third from the endwall 20 and back across the receptacle 12 through the corresponding aperture 24 of the sidewall 16. This procedure is repeated along the length of the apparatus 10 to string a series of incremental lengths of the wick material 34 across the receptacle 12. The wick material 34 is finally secured to the post 32 closest to the endwall 18.

Once the wick material 34 is weaved through the apparatus 10, a series of parallel, incremental lengths of the wick material 34 are supported by the apertures 24 across the receptacle 12. The posts 30 and 32 are positioned at a predetermined distance from their respective sidewalls 14 and 16 to ensure that a desired lengths of wick material 34 are secured outside the receptacle. The wick material 34 is strung sufficiently taut to prevent the lengths of wick material 34 within the receptacle 12 from sagging appreciably.

Figure 2:
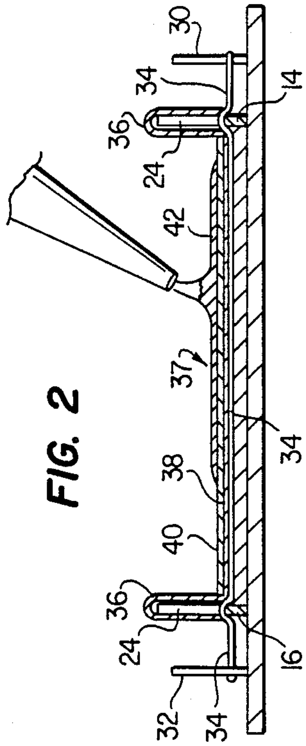
FIG. 2 is a cross-section view of the apparatus incorporating the first embodiment of the invention, taken along section line 2—2 in FIG. 1, which illustrates an intermediate phase of the method of the invention.

After training the wick material 34 through the apparatus 10, the apertures 24 must be sealed in preparation for placement of molten wax within the receptacle 12. This is accomplished by securing clamp bars 36 over each of the sidewalls 14 and 16. The clamp bars 36 are approximately the same length as each of the sidewalls 14 and 16 and, as is best shown in FIG. 2, have a narrow, U-shaped cross-section to allow the bars 36 to grip the sidewalls 14 and 16 of the receptacle 12. As is further shown in FIG. 2, the lower edges of the clamp bars 36 extend below the lower edges of the apertures 24 when the clamp bars 36 are fully seated on the sidewalls 14 and 16, thereby sealing the apertures 24. When in place, the clamp bars 36 also displace the wick material 34 slightly below the lower edges of the apertures 24 to secure the wick material 34 against movement.

After sealing the apertures 24 with the clamp bars 36, molten wax is poured into the receptacle 12 to form a wax slab 37. As is illustrated in FIG. 2, the molten wax is poured into the receptacle 12 at intervals to form a series of preferably three contiguous layers 38, 40 and 42 of wax. This provides a relatively smooth upper surface for the slab 37.

During the first interval, molten wax is poured into the receptacle 12 to a level slightly above the lengths of wick material 34 strung across the receptacle 12, creating a first layer 38 of wax. The layer 38 of wax is allowed to cool to a point where its upper surface begins to harden. This is usually indicated by clouding and rippling of the upper surface of the wax layer 38. The middle wax layer 40 is then poured onto the bottom wax layer 38. The wax layer 40 is approximately one-half the thickness of the bottom layer 38, which reduces rippling of the upper surface of the wax layer 40 during cooling. Once the wax layer 40 has cooled sufficiently, the top wax layer 42 is added. The wax layer 42 is preferably thinner than the middle wax layer 40, thereby further reducing the rippling effect caused during cooling, and providing a relatively smooth upper surface. Both the thickness and number of wax layers used can be varied to achieve the desired thickness of the wax slab 37, as well as the degree of smoothness of its upper surface.

Figure 3:
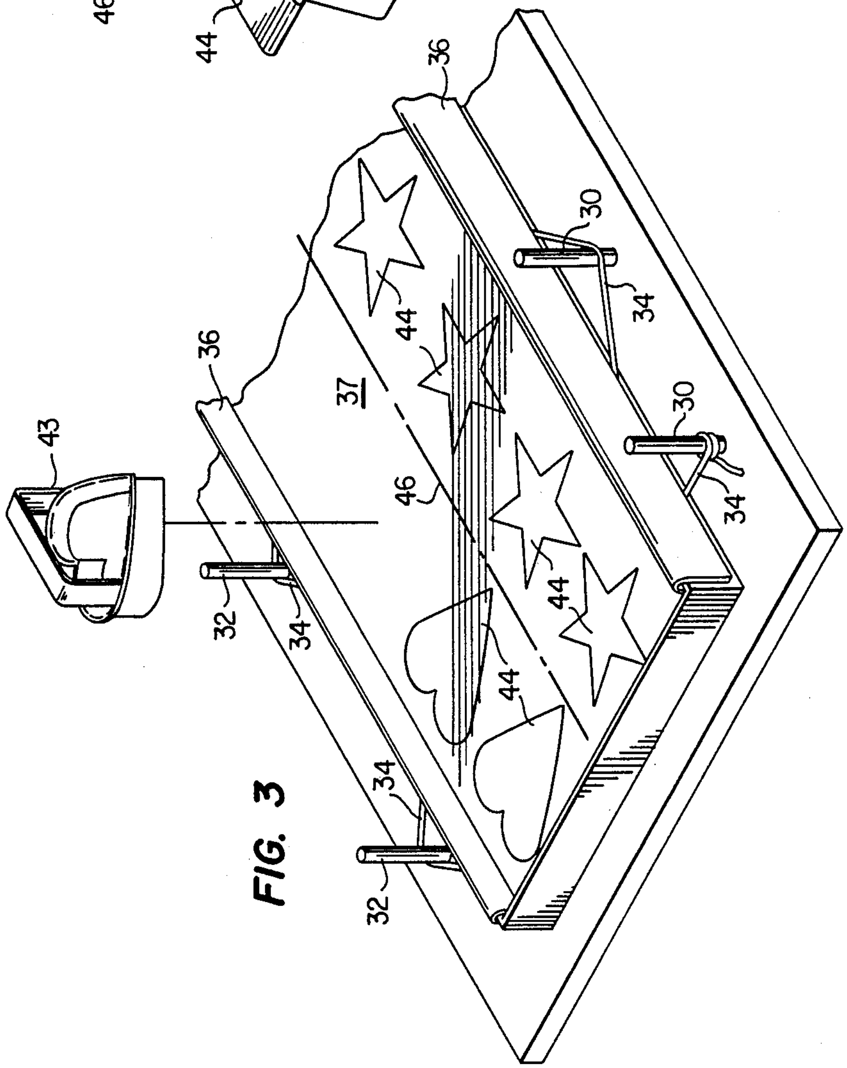
FIG. 3 is a perspective view of an apparatus incorporating the first embodiment of the invention which illustrates a final phase of the method of the invention.

FIG. 3 illustrates the method by which candles of various sizes and shapes are formed from the wax slab 37. This procedure is preferably initiated after the wax slab 37 has cooled to a semi-hard consistency. A wax cutter 43 similar to a common cookie cutter is used to form candle bodies 44 from wax surrounding the wick material 34. Although the cutter 43 shown is heart-shaped, cutters having other shapes may be employed as desired.

The cutter 43 is first placed on the wax slab 37 adjacent either of the sidewalls 14 and 16 and above one of the lengths of wick material 34 within the slab 37. The cutter is pressed into the semi-hard wax slab 37 until abutting the bottom wall 22 of the receptacle 12. Although the cutter normally displaces the wick material 34 immediately adjacent the cutting edges downwardly, practice has shown that the wick material 34 stretches enough to avoid damaging the edges of the candle body formed by the cutter. The receptacle 12 is wide enough to allow two candle bodies to be cut around each length of wick material 34 within the receptacle 12. It will be apparent that the apparatus 10 allows virtually any combination of shapes to be cut into the slab 37.

Removal of the candle bodies 44 from the wax slab 37 is accomplished by cutting a longitudinal seam 46 along the center of the slab 37 between the candle bodies 44 adjacent the sidewalls 14 and 16 of the receptacle 12. The wick material 34 is then cut at points intersecting the seam 46 to separate the candle bodies 44 adjacent the sidewall 14 from the candle bodies 44 adjacent the opposing sidewall 16. The clamp bars 36 are then removed from the sidewalls 14 and 16, allowing the lengths of wick material 34 trained around the posts 30 and 32, and the pair of candle bodies to which such lengths of wick material 34 are connected, to be removed from the candle making apparatus 10. Once removed from the apparatus 10, excess wick material 34 may be cut from the candle bodies 44. If desired, the candle bodies 44 may then be dipped in wax or painted with waxes of various colors and scents to provide a large selection of products.

Figure 4:
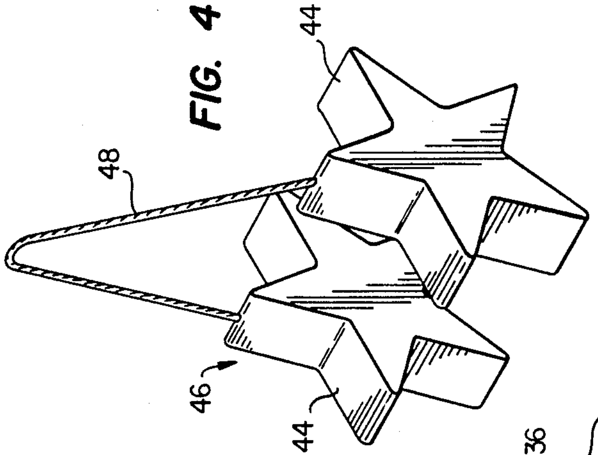
FIG. 4 illustrates a pair of candles manufactured by the method and apparatus of the invention.

FIG. 4 illustrates a pair of candles 46 manufactured with the candle making apparatus 10. The candles 46 comprise a pair of candle bodies 44 shaped in the form of star figures; however, it will be apparent that the candle bodies 44 could be manufactured in numerous other shapes and need not be similar in shape.

The candle bodies 44 are interconnected by a wick 48, which is used to hang the candles 46 as decorations from door handles, hat racks, and the like. The wick 48 is not coated with wax, to avoid undesirable deposits of wax from forming on articles from which the candles 46 are hung and to allow the wick 48 to remain flexible and thus easily hung from many types of objects. It will be apparent that the wick 48 comprises a length of wick material 34 secured outside the receptacle 12 of the candle making apparatus 10 by one of the posts 30 and 32. The length of the wick 48 is dependent on the distance of the Posts 30 and 32 from their associated pair of receptacles 24. The candles 46 may be colored and/or scented, as desired, by applying a suitable outer wax layer to the candle bodies 44 following their removal from the candle making apparatus 10. This may be accomplished by dipping the candle bodies 44 in molten wax or by painting the bodies with wax. Alternatively, the candle bodies 44 may be manufactured from colored and/or scented wax.

Figure 5:
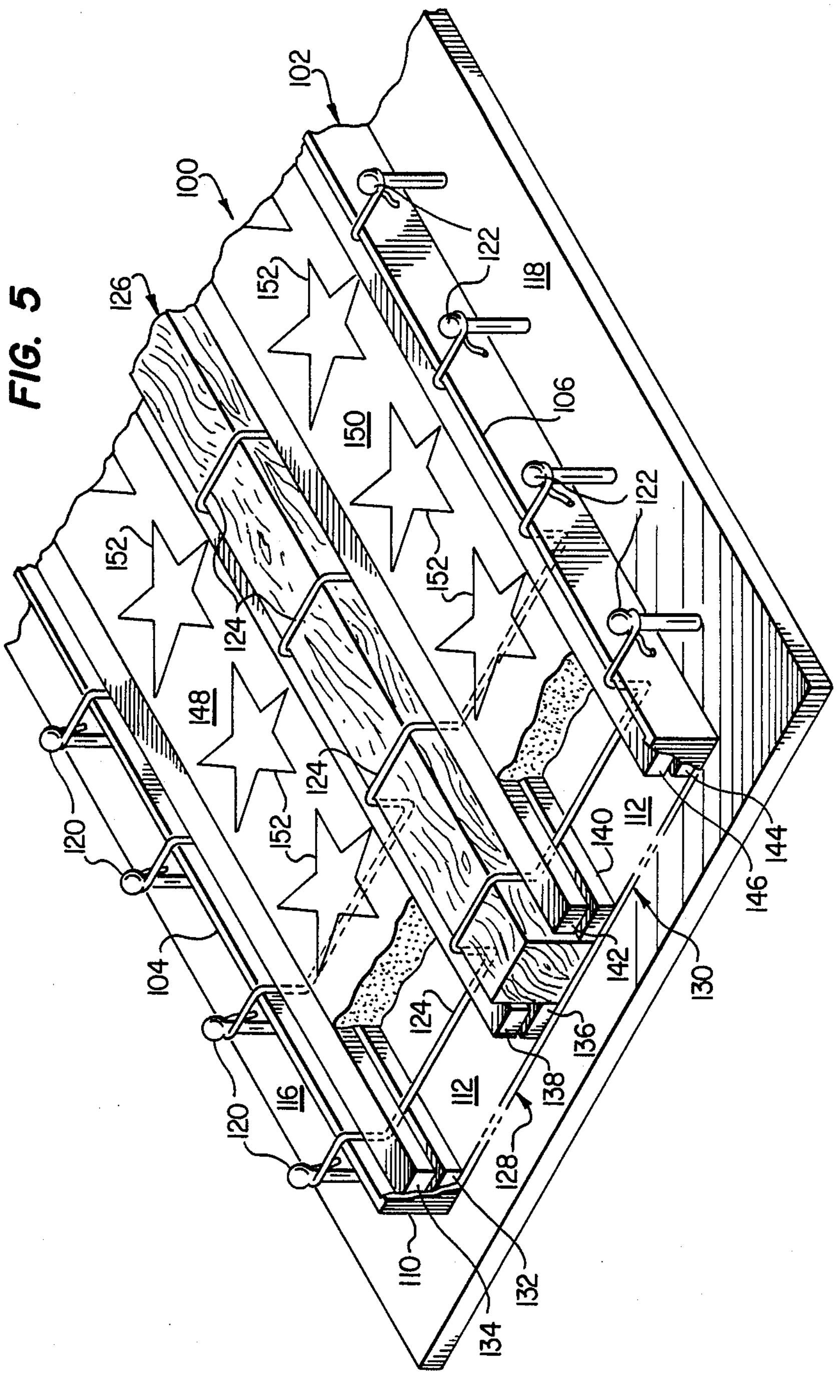
FIG. 5 is a perspective view of an apparatus incorporating a second embodiment of the invention which illustrates multiple phases of the method of the invention.

FIG. 5 illustrates a candle-making apparatus 100 incorporating a second embodiment of the invention. The apparatus 100 includes a container 102 having a pair of sidewalls 104 and 106 and a pair of opposing endwalls (only endwall 110 shown, in part) extending upperwardly from a bottom wall 112. The container 102 is used to hold molten wax as candles are manufactured and is preferably made of sheet metal, hard plastic or other suitable material having a melting point substantially greater than the candle wax intended to be used.

The bottom wall 112 of the apparatus 100 extends laterally from the container 102 to form a pair of flanges 116 and 118 adjacent the sidewalls 104 and 106, respectively. Extending upwardly from the flanges 116 and 118, respectively, are a number of posts 120 and 122. The posts 120 and 12 are cylindrical and extend above the flanges 116 and 118 to a height greater than the upper edges of their adjacent sidewalls 104 and 106. Each post 120 adjacent the sidewall 104 is positioned directly opposite a corresponding post 122 adjacent the opposing sidewall 106. Corresponding pairs of the post 120 and 122 serve as means for securing ends of a series of lengths of wick material 124 used during the candle-making procedure.

The container 102 is divided along its longitudinal center line by a wick supporting member 126 secured to and extending upwardly from the bottom wall 112. The wick supporting member 126 serves as a barrier forming two adjacent receptacles 128 and 130 containing two distinct volumes of a quantity of molten wax used in the candle-making procedure. The wick supporting member 126 also supports an intermediate portion of each length of wick material 124 out of contact with molten wax within the container 102 as candles are made. The supporting member 126 is preferably constructed from materials similar to those used to construct the container 102.

The apparatus 100 is used to manufacture candles by first securing one end of each length of wick material 124 to one of the posts 120. Each length of wick material 124 is then drawn across the sidewall 104 and downwardly toward the bottom wall 112 of the container 102. The lengths of wick material 124 are then gripped between a pair of bars 132 and 134, preferably manufactured from flat band iron, which extend along the length of the container 102 adjacent the sidewall 104. The weight of the upper bar 134 is sufficient to secure the lengths of wick material 124 against movement. The lengths of wick material 124 are then drawn across the receptacle 128 and secured adjacent the wick supporting member 126 by a second pair of bars 136 and 138. The lengths of wick material 124 are then further drawn over the wick supporting member 126 and secured within the receptacle 130 in a similar fashion utilizing third and fourth pairs of bars 140, 142, 144 and 146. Finally, the free end of each length of wick material 124 is secured to a post 122 corresponding to the post 120 to which the length of wick material 124 was originally secured. The lengths of wick material 124 are strung sufficiently taut between the bars 132–146 within the container 102 to prevent appreciable sagging.

Once the lengths of wick material 124 are properly secured by the apparatus 110, molten wax is poured into the receptacles 128 and 130 to form a pair of wax slabs 148 and 150 (partially shown), respectively. The procedure used to form the wax slabs 148 and 150 is preferably that described above with respect to FIG. 2. By following that procedure, a relatively smooth upper surface is formed on each of the slabs 148 and 150. It will be appreciated that the thicknesses of the bars 132–146 is preferably half of the desired thickness of the wax slabs 148 and 150, thereby positioning incremental lengths of each length of wick material 124 within the receptacles 128 and 130 near the center of each of the wax slabs 148 and 150.

Following cooling of the wax slabs 148 and 150 to a semi-hard consistency, a wax cutter (not shown) is used to form candle bodies 152 from the wax of each of the slabs 148 and 150 surrounding the lengths of wick material 124. A pair of candles interconnected by a length of wax-free wick, such as that shown in FIG. 4, are formed by removing a pair of candle bodies 152 sharing a common length of wick material 124 from the container 102 and removing the ends of the wick material 124 extending from the candle bodies 152. It will be apparent that the length of the portion of wax-free wick material between the candle bodies includes that portion of the wick material gripped between the bars 136, 138, 140 and 142 and extending over the wick supporting member 126. The candle bodies may be decorated and/or used in any manner similar to that described above with reference to FIG. 4.

Although only two receptacles 128 and 130 are formed within the container 102, it will be apparent that the present invention can be incorporated in a container having additional receptacles. This can be accomplished by providing a wider container divided by additional wick supporting members to provide additional receptacles, as desired. In this manner, more than one pair of candle bodies or a series of candle bodies can be manufactured that are interconnected by lengths of wax-free wick material. It will also be apparent that the receptacles can be constructed from individual containers, instead of utilizing a wick supporting member to separate adjacent volumes of molten wax.

Although preferred embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

We claim:

1. An apparatus for manufacturing candles comprising:

container means forming a plurality of distinct receptacles for holding a quantity of molten wax;

wick support means for supporting an incremental length of a single length of wick strung across the container means within each of the receptacles of the container means and in contact with molten wax held by the receptacles; and spacing means interposed between the receptacles for separating the receptacles, and the wax contained by each receptacle, a predetermined distance apart, for securing at least one wax-free portion of the wick strung between adjacent receptacles out of contact with the wax, and for releasing the wax-free portion of the wick once the wax has hardened around portions of the wick within the receptacle.

2. The apparatus of claim 1 wherein the receptacles of the container means are separated by a predetermined distance to further facilitate concurrent manufacture of two or more candles interconnected by a length of wax-free wick.

3. The apparatus of claim 1 wherein the spacing means include a member secured within the container means for both separating adjacent receptacles by a predetermined distance and securing a portion of the wick between adjacent receptacles out of contact with the wax.

4. The apparatus of claim 1 wherein each receptacle of the container means includes a substantially flat bottom surface and wherein the wick support means supports each incremental length of wick in tension at a predetermined distance above the bottom surface at least one of the receptacles.

5. The apparatus of claim 4 wherein each wick support means includes a plurality of bar members of predetermined thickness for gripping and holding the wick at a predetermined distance above the bottom surface of the receptacles, the predetermined distance corresponding to the thickness of the bar members.

* * * * *